United States Patent
Hu et al.

(10) Patent No.: US 9,591,007 B2
(45) Date of Patent: Mar. 7, 2017

(54) DETECTION OF BEACONING BEHAVIOR IN NETWORK TRAFFIC

(71) Applicant: International Business Machines Corporation, Armonk, NY (US)

(72) Inventors: Xin Hu, White Plains, NY (US); Jiyong Jang, White Plains, NY (US); Douglas Schales, Ardsley, NY (US); Marc Stoecklin, Bern (CH); Ting Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/668,595

(22) Filed: Mar. 25, 2015

(65) Prior Publication Data

US 2016/0134641 A1    May 12, 2016

Related U.S. Application Data

(60) Provisional application No. 62/075,931, filed on Nov. 6, 2014.

(51) Int. Cl.
*H04L 29/06*    (2006.01)

(52) U.S. Cl.
CPC ...... *H04L 63/1416* (2013.01); *H04L 63/1425* (2013.01); *H04L 63/101* (2013.01)

(58) Field of Classification Search
CPC ....... H04L 63/00; H04L 63/02; H04L 63/029; H04L 63/10; H04L 63/101; H04L 63/104;
(Continued)

(56) References Cited

U.S. PATENT DOCUMENTS

| | | | |
|---|---|---|---|
| 5,412,658 A | 5/1995 | Arnold et al. | |
| 7,885,602 B1 * | 2/2011 | Kelsey | H04L 63/104 370/338 |

(Continued)

FOREIGN PATENT DOCUMENTS

JP    2015-18122 A    10/2015

OTHER PUBLICATIONS

Noble, Kevin "Detecting Malicious Beacons" [Online], Mar. 11, 2014 [Retrieved: Apr. 16, 2016], www.blogspot.com, Retrieved from: < http://deviantpackets.blogspot.com/2014/03/detecting-malicious-beacons.html >.*

(Continued)

*Primary Examiner* — Eric W Shepperd
(74) *Attorney, Agent, or Firm* — Jeff LaBaw, Esq.; McGinn IP Law Group, PLLC

(57) ABSTRACT

A method for detecting beaconing behavior includes pre-processing network records to identify candidate source and destination pairs for detecting beaconing behavior, where each source and destination pair is associated with a specific time interval in a plurality of time intervals forming a time range, the time interval and time range having been pre-defined. The activity time interval information is converted from the time domain into the frequency domain. Candidate frequencies are determined from the source and destination pairs, as likely candidate frequencies/periodicities of beaconing activities.

19 Claims, 9 Drawing Sheets

Periodicity Detection

(58) Field of Classification Search
CPC . H04L 63/14; H04L 63/1408; H04L 63/1425; H04L 63/16; H04L 2463/144; H04L 2463/146
See application file for complete search history.

(56) References Cited

U.S. PATENT DOCUMENTS

| | | | |
|---|---|---|---|
| 8,081,575 | B2 | 12/2011 | Habetha |
| 8,578,493 | B1* | 11/2013 | Cowan ................ G06F 21/554 709/224 |
| 9,204,341 | B2 | 12/2015 | Su |
| 2005/0113090 | A1* | 5/2005 | Sharony ................ G01S 5/0252 455/436 |
| 2005/0124345 | A1* | 6/2005 | Laroia ................... H04W 36/06 455/437 |
| 2007/0155314 | A1* | 7/2007 | Mohebbi ............ H04B 7/15507 455/11.1 |
| 2009/0235354 | A1* | 9/2009 | Gray ................... H04L 63/1416 726/22 |
| 2010/0091702 | A1 | 4/2010 | Luo et al. |
| 2012/0023552 | A1* | 1/2012 | Brown .................. H04L 63/14 726/3 |
| 2013/0028293 | A1 | 1/2013 | Makh et al. |
| 2013/0179593 | A1* | 7/2013 | Dunlap .................. H04L 45/42 709/244 |

OTHER PUBLICATIONS

Cui et al. "An Approach to Detect Malware Call-Home Activities" [Online], Dec. 16, 2013 [Retrieved on: Apr. 16, 2016], SANS Institute, Retrieved from: < https://www.sans.org/reading-room/whitepapers/detection/approach-detect-malware-call-home-activities-34480 >.*

McCusker et al ("Deriving Behavior Primitives from Aggregate Network Features Using Support Vector Machines", 2013 5th International Conference on Cyber Conflict, p. 27-45,K. Podins, J. Stinissen, M. Maybaum (Eds.) 2013 © NATO CCD COE Publications, Tallinn).

\* cited by examiner

DETECTION OF BEACONING BEHAVIOR IN NETWORK TRAFFIC

This Application is a non-provisional application of U.S. Provisional Patent Application Ser. 62/075,931, filed on Nov. 6, 2014.

BACKGROUND

The present invention relates to cyber security, and more specifically, to detecting beaconing behavior using time rescaling and aggregation, followed by an analysis in the frequency domain.

Sophisticated cyber security threats, for example advanced persistent threats (APTs), employ strategies to infect end points within a security perimeter and instruct these machines (e.g., by means of a malware process) to issue regular callback traffic, hereinafter referred to as "beaconing", to a machine outside the perimeter of an organization (e.g., the Internet) controlled by an attacker. Other well-known cases employing beaconing traffic are botnet command and control infrastructures, where bots use such techniques to announce themselves and establish stealthy communication channels in order to receive instructions from the botnet master. In general, beaconing traffic can be characterized as regular (periodic) traffic (e.g., network connections, network packets) to a destination point. It is also noted that beaconing traffic is not necessarily generated by a malware process since beaconing traffic also occurs for benign, desirable network operations, such as occurs when a safe application sends out update requests.

Existing solutions to detect beaconing behavior include pattern matching, statistical techniques and trending, grouping and rate-based thresholds, and finite state machines. Pattern-matching-based approaches search for predetermined periodic patterns (e.g., one connection every 10 seconds in the network traffic). Methods based on statistical techniques, trending, grouping, and rate-based threshold first group related connections together, extract statistical features such as mean and standard deviation of connection intervals, and determine the existence of beaconing behavior if the features or rates are over certain pre-defined thresholds. Other solutions implement finite state machines to find periodic events where there are more than a certain number of flows between two IP addresses at a regular interval The drawbacks of existing solutions include a large memory footprint (e.g., requiring a state-machine for every source/destination pair). Another drawback is that they are limited to a short analysis time window (e.g., in the order of minutes or hours). Further, existing solutions assume strictly regular, consecutive, and periodic beaconing behavior, which is often not the case in real-world network traffic.

In reality, intervals are not strictly periodic, as endpoints dynamically join and leave the network, endpoints restart, gaps or noises exist in the observation, and/or malware may change its beaconing behavior. In addition, some malware employ multiple periodicities, such as short intervals (e.g., seconds) for contact establishment, followed by intervals of remaining dormant for a longer period of time (e.g., hours or days).

SUMMARY

According to an embodiment of the present invention, a novel approach and mechanism are able to detect beaconing behavior of potentially infected end points in data streams collected from the network. In an exemplary embodiment of the invention, the detected beaconing behaviors are ranked in terms of their relevance as a mechanism to better expose beaconing behavior that demonstrate higher concerns and confidence as potential undesired beaconing behavior. Thus, the present invention provides a system that can automatically locate the source of detected beaconing from the network, so that they can selectively be isolated through user intervention to remove/eliminate an infected end point from a security perimeter by blocking or otherwise shutting it down.

DETAILED DESCRIPTION

Figure 1:
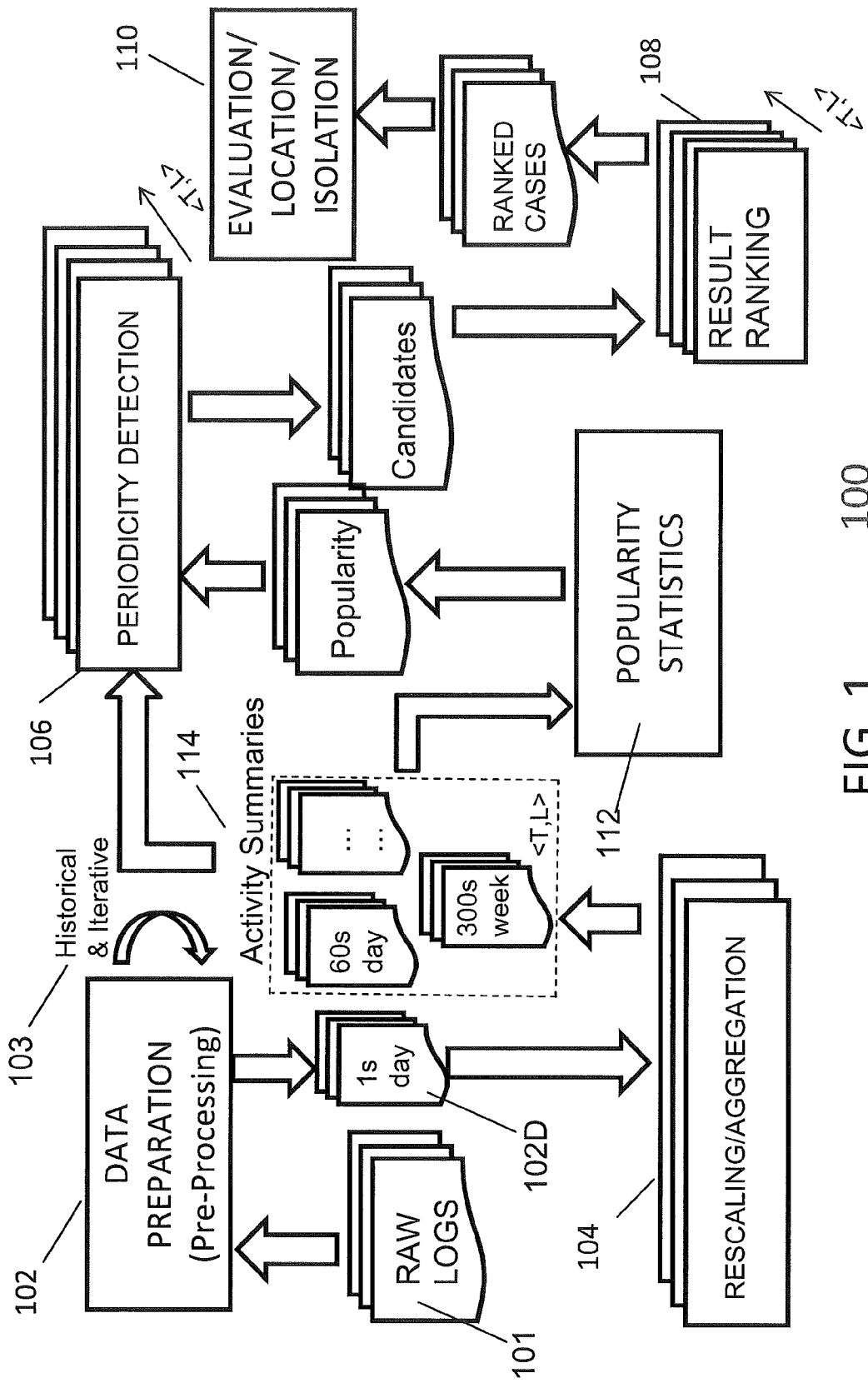
FIG. 1 illustrates sequential processing steps 100 for one exemplary embodiment of the invention.

With reference now to FIG. 1, the present invention comprises a system and method to detect beaconing in various data streams collected from the network (including HTTP proxy logs, firewall logs, NetFlow, raw packet capture, etc.) and to output rank-ordered results after analyzing additional characteristics of detected beaconing candidates. The invention uses a novel technique leveraging analysis in the frequency domain to identify multiple candidate frequencies and includes a verification step to exclude safe beaconing activities from further expensive investigation.

In addition, a result ranking step of the process is modular, meaning that it takes into account additional characteristics of the traffic (including, as non-limiting examples in the exemplary embodiment described herein, lexical analysis of domain names, popularity measures, interval statistics, etc.) to rank the results in terms of relevance. Although additional characteristics, including parameters not yet recognized, could be added to the result ranking, thereby expanding the current modularity of the exemplary ranking step, the present inventors consider that interval, lexical, and popularity analyses are particularly relevant to detecting beaconing behavior, Thus, in the context of the present invention, the term "modular" for the ranking step is intended to refer to the concept of analyzing the traffic data from the perspective of different characteristics, with analysis under each such characteristic providing an independent aspect of the potential for beaconing behavior even though they may be used in the calculations in a manner that combines and mixes them together.

In a preferred exemplary embodiment, the present invention can automatically identify potential infected end points and send out an advisory message to an administrator who can then take appropriate actions concerning isolation and deletion, including other actions such as adding a domain to a blacklist. In the context of the present invention, an end point refers to any computer or processor-based device, and an end point is typically a device used for two-way communication. Typical non-limiting examples of end points might include computers, laptops, servers, mobile phones, etc.

In comparison with state-of-the-art methods, the present invention is able to detect multiple periodicities in parallel. The method is designed to handle imperfect observations with high tolerance and is able to detect shifted signals. It is furthermore scalable over long time windows, as provided by a rescaling and aggregation step that enables analyses over weeks and even months of traffic with low complexity (by reducing the precision of the input time values). This capability is infeasible with existing conventional beaconing monitoring solutions. The invention additionally provides a rank ordering of the results in terms of additional traffic features, for review and action by an administrator, and the tool can also be configured to selectively proceed to locate and to selectively isolate detected potential beaconing threats.

FIG. 1 illustrates in summary flowchart format 100 a high-level diagram of the sequential processing steps for one exemplary embodiment of the invention. However, as a preliminary matter, it is noted that key concepts in the mechanism of the present invention include temporal resolution T and analysis length L (e.g., time range), as demonstrated by the symbol "<T.L.>" in various places in FIG. 1. This figure also shows various specific exemplary values. For example, the symbology "1 s day" means 1 second resolution (granularity) and 1 day aggregation, which indicates that the data is resolved in 1 second periods over daily intervals.

Turning now to FIG. 1, in the first step 102, data preprocessing is performed on raw network observations 101, in which source and destination identifiers, as well as time stamps of every observation are extracted, to produce a compact representation of the past network activity over the current aggregation interval period of time. As exemplarily indicated in FIG. 1, the pre-processing resolution/aggregation 102D is "1 s day", although it should be clear that these specific resolution and aggregation values are non-limiting and used only for purpose of explaining the present invention. More generically, the output of the data preparation step 102 will typically be the finest possible resolution over a specific time interval. The specific values for resolution/aggregation are parameters which can be set by operator inputs or could operate using default values, as selectively modified by user inputs.

In the second step 104, the resulting representation is rescaled and aggregated into lower time resolution and longer time windows to enable scalable detection of periodicities over longer time intervals. Examples are shown in the activity summaries 114 in FIG. 1, but it should be clear that user input could provide different resolution/aggregation values, that standard default values could be used or selectively used, or even that a controller (not shown) could automatically define/modify these resolution/aggregation values for the activity summaries 114.

The label "Historical & Iterative" 103 indicates that either the prepared data 102D from the data preparation stage 102 or the activity summary 114 data, and preferably both, could be stored in a historical database, so that longer historical data can be used in conjunction with output data 102D of a current preprocessing period, to further extend the length of aggregation/analysis length (time range) to include previous activity periods.

In the third step 106, periodicity detection is performed on the <T.L> sets of data, including the initial pre-processed data of the most current aggregation periods, in the frequency domain, to provide candidate source and destination identifier pairs which exhibit periodic behavior.

In the fourth step 108, candidate results are then further evaluated and ranked in a modular fashion, meaning that additional independent characteristics are introduced to further evaluate the candidate pairs. A preferred exemplary embodiment includes the effects of at least the characteristics of popularity 112 and domain lexical analysis (not shown in FIG. 1), as well as interval statistics. Popularity statistics 112 provide one of the modular characteristics and are used to assess the influence of locally popular destination identifiers.

In the fifth step 110, an administrator or other user can evaluate the rankings output from the process.

Figure 2:
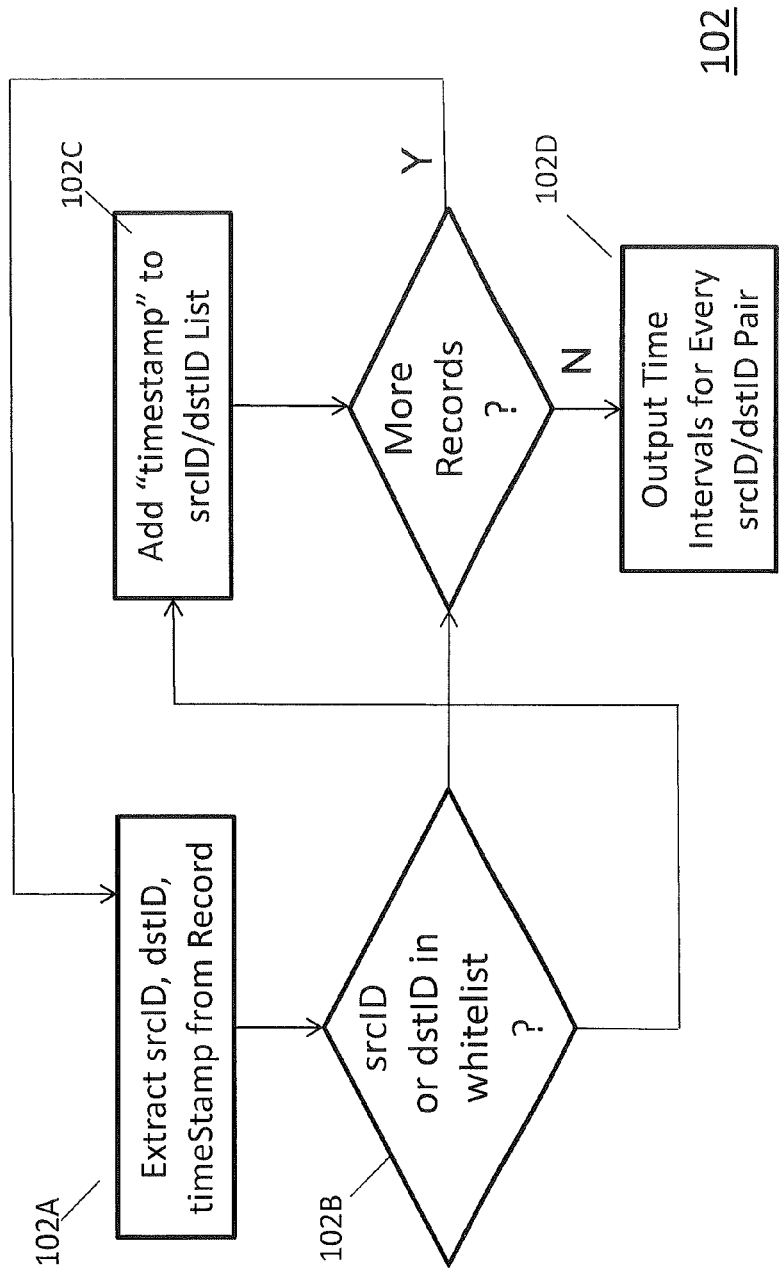
FIG. 2 illustrates the data preparation, or pre-processing, step 102 of the exemplary embodiment 100.

Breaking down these high-level steps in more detail, FIG. 2 exemplarily illustrates the data preparation, or pre-processing, step 102. In this step 102, raw network observations and logs (including, for example, HTTP proxy logs, firewall logs, NetFlow, raw packet capture, etc.) are analyzed and translated into a time-interval-based representation (Activity Summaries 114). Every network observation generally consists of multiple identifier fields and time information. The preparation process is generic and enables configuration of the fields to be used as a source identifier and a destination identifier. Typical source identifiers may comprise, but are not limited to, source IP addresses, MAC addresses, source device identifiers, and user names. Typical destination identifiers may include, but are not limited to, destination IP addresses, destination domain names, URLs, port numbers, peers (e.g., IP+port, domain name+port) and protocols.

In the first substep 102A, for every record, source and destination information is extracted along with a time stamp. In the next substep 102B, verification is made whether either the present source and/or the destination identifier appears in a white list, understood in the art as a listing of sources/destinations considered as posing no threat. That is, a white list for a site would contain a number of benign (i.e., known non-malicious) beaconing activities, such as routine application program update requests, that are registered as safe beaconing to known safe sites.

If the white list verification is positive, the record is excluded from further evaluation, in order to reduce the amount of processing of site network activity to only those source/destination identifiers not listed on the white list as known safe sites. Otherwise, in substep 102C the time stamp is extracted and added to a list of time stamps for a given source/destination ID pair. Substeps 102A, 102B, and 102C are repeated for all records.

After processing all records, a sequence of time intervals is output for every pair, in substep 102D. It is noteworthy to mention that the data preparation step 102 has to be run only once for every observation time interval and can output time intervals for different source/destination field configuration simultaneously (e.g. source IP→destination IP, source MAC→domain name, etc). In a preferred embodiment, this illustrated process is iterative and adds additional pre-processed output to a data repository (Activity Summaries) when new raw logs are available. Thus, the present invention can be used in a manner that historical data can be stored in a database, so that the database can be periodically updated every time a new data preparation step 102 is executed on a location. Such mechanism clearly permits the present invention to detect possible threats over longer time scale for which data exists and/or is stored for that location.

The second step 104 from FIG. 1, of rescaling/aggregation takes output from step 102 (and any previous runs of step 104) and modifies time resolutions of the intervals for every source/destination ID pair and performs temporal aggregation over multiple time windows, to thereby form a plurality of temporal resolution, analysis length/time range (<T,L>) sets that are then selectively processed by remaining stages. A time resolution may be modified to lower resolutions (where lower resolutions are multiples of the input resolution), e.g., from 1-second resolution to 10-second resolution, from 10-second resolution to 60-second resolution. Temporal aggregation merges longer time windows (represented as separate files in the input) into a single sequence of time intervals for every source/destination ID pair, e.g., aggregating over days, weeks, or months. In a preferred exemplary embodiment, the rescaling/aggregation of data from a shorter time interval into a longer time interval, the longer time interval will merely reflect that at least one incident occurred in the longer time interval and would not provide details about whether multiple incidents occurred in the longer time interval.

The output of step 104 is interval information at various time scales, as indicated by the activity summaries 114. It should be clear that the resolutions and aggregations shown in FIG. 1 are exemplary and that any number of other values would be possible. It should also be clear that the specific values for resolution/aggregation could be controlled by operator input parameters, with possibly default values.

Figure 3:
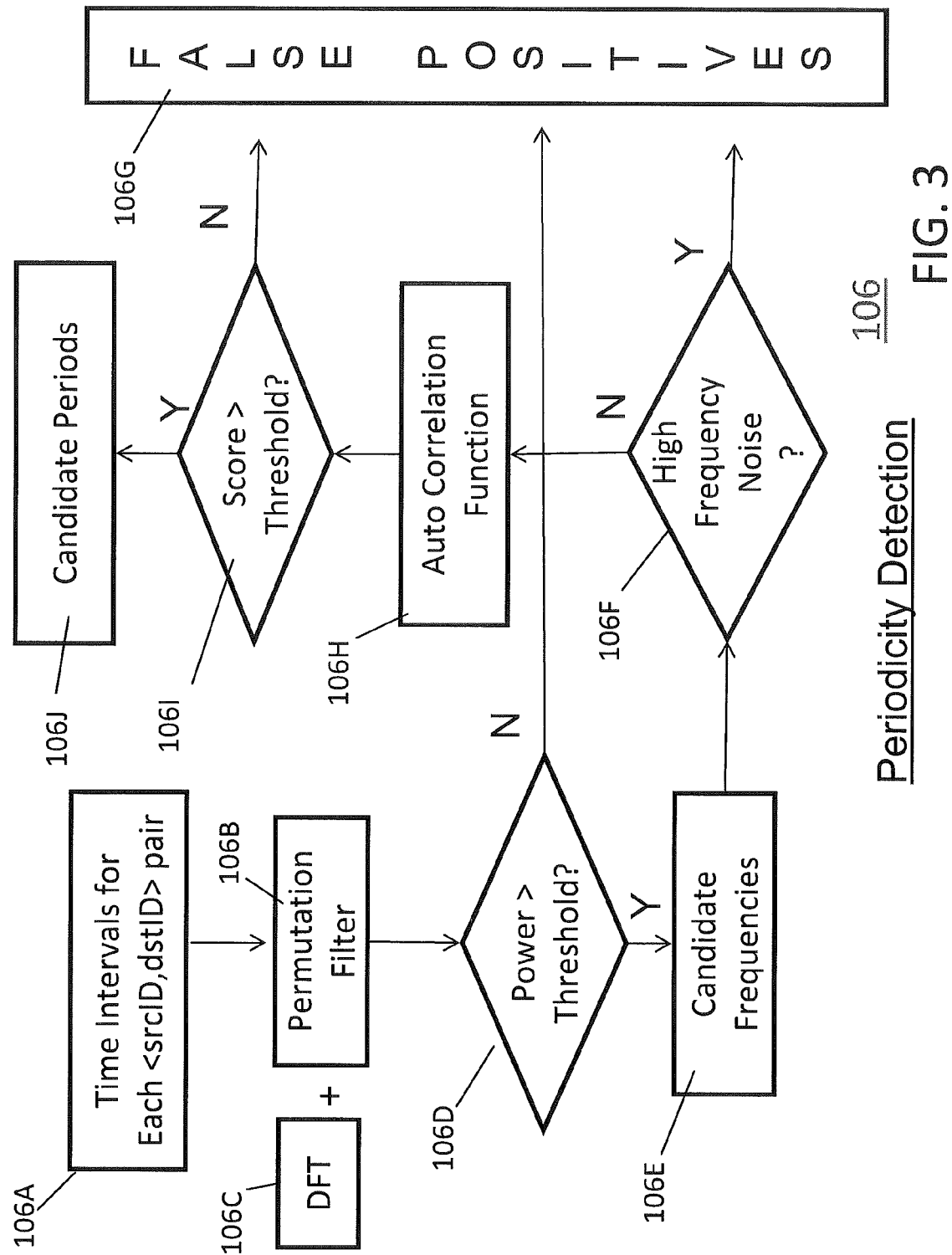
FIG. 3 illustrates the periodicity detection step 106 of the exemplary embodiment 100.

In the periodicity detection step 106 illustrated in detail in FIG. 3, the interval information 106A at various time scales is now analyzed for periodicities. The periodicity detection step 106 takes the time intervals for source and destination ID pairs and applies a frequency analysis approach, meaning that the time interval data is converted into the frequency domain.

In a preferred exemplary embodiment, the frequency analysis approach first applies a permutation filter 106B, then discovers candidate frequencies and periodicities by computing a discrete Fourier transform (DFT) of random permutations 106C and comparing power levels in the DFT domain with a predetermined power threshold level 106D. It is noted that discrete Fourier transform (DFT) is well-known in engineering, particularly signal processing, as a mechanism to convert time-domain data into the frequency domain. The variation of DFT using random permutations involves taking a number of random samplings and provides an efficient method for estimating key characteristics of a signal e.g. maximum power across the frequency spectrum of random permutations which can be used to select a power threshold of the signal's true frequencies. This random permutations variation of DFT can be used to provide the permutation filter 106B shown in FIG. 3.

By comparison to the power threshold, in step 106D, the method then identifies a set of candidate frequencies 106E of the analyzed signal. In an exemplary embodiment, the power threshold is determined from the permutation filter described above, by analyzing the frequency spectrum of random permuted signals. Such analysis provides the maximum power carried by the random permutated signal. That maximum power is used as the threshold, so that only the frequencies in the original signal that have the power higher than the threshold will be chosen as the candidate frequencies.

Next, high frequency noise is pruned 106F by clustering of candidate frequencies and removing impossible frequencies 106G. An autocorrelation score (AC) 106H is then calculated to measure how similar a time series is to itself shifted by t, using a standard equation for computing autocorrelation, as follows:

$$ACF(t) = \frac{1}{N}\sum_{n=0}^{N-t} x(n) * x(n+t),$$

where ACF(t) is the autocorrelation function for a particular t; x(n) is the signal which hash length N.

Since APTs typically have high periodicity, it should be clear that the autocorrelation score (AC) could be a key indication of a possible APT activity. Finally, the presence or absence of periodicity per input features is determined by comparison to a score threshold 106I, to identify the most likely candidate frequencies 106J, for a given source/destination ID pair.

Figure 4:
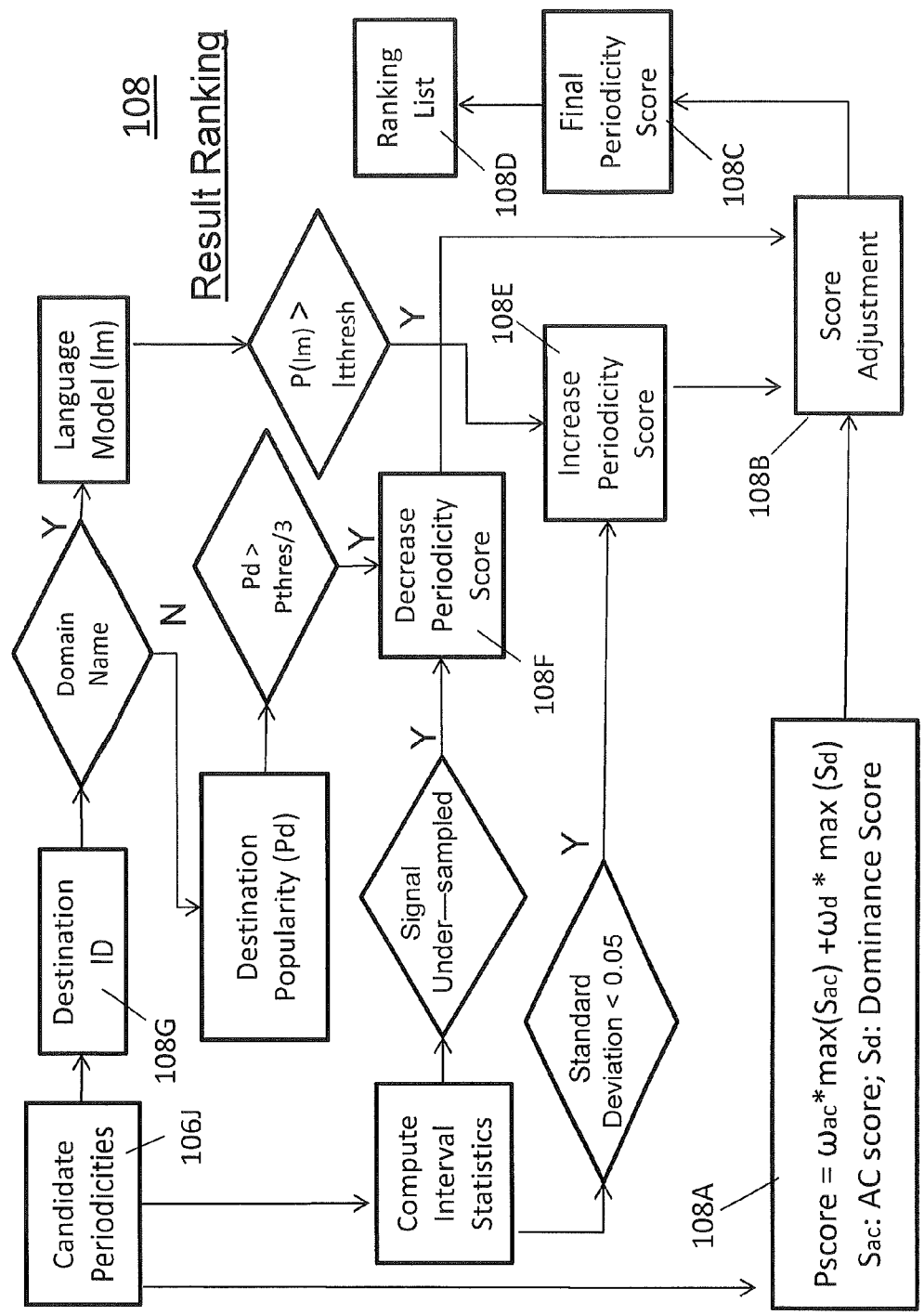
FIG. 4 illustrates the results ranking step 108 of the exemplary embodiment 100.

The further processing in the result ranking step 108 is detailed in FIG. 4, whereby source/destination pairs are rank-ordered in a modular manner, as based on several different aspects, including, in an exemplary embodiment, language model 108G of the destination ID, popularity score 108L, and periodicity strength 108A. As can be seen in FIG. 4, the result ranking step 108 begins with the candidate periodicities 106J output from the periodicity detection substep 106 shown in FIG. 3. In the first substep 108A, each candidate periodicity has its autocorrelation score ($S_{ac}$) and dominance score ($S_d$) incorporated into the Pscore equation.

The dominance score Sd measures how dominant or prevalent a candidate period appears in the time intervals of a src/dst ID pair. It is calculated as the number of intervals that are close to (e.g., possibly as determined using a predetermined threshold, depending upon resolution) or that contain the detected period, divided by the total number of time intervals.

For example, assume that time intervals for a specific src/dst ID pair are [2, 5, 3, 5, 10, 5, 5, 3] and the detected period is 5 seconds. Since there are four 5-second intervals in this interval listing and a total of eight intervals, the dominance score would be [(4 intervals of detected periods)/(8 total intervals)]=0.5, for this exemplary listing. The higher the dominance score Sd, the more strictly regular the detected periody appears to be.

Thus, in step 108A, the initial periodicity score Ps is defined as a combination of dominance score Sd and autocorrelation score Sac (which is also an objective indication of the strength of the periodicity) using the weighted relationship shown in this step. The weight factors Wac and Wd can be adjusted by the administrator or user according to a desired relative importance of Sd and Sac. Alternatively, there could be automatic adjustment of these weight factors, as determined by an estimation of accuracy of the result ranking list over time. Empirically, Wac and Wd could be equal and set to 0.5.

The substep then proceeds to adjust the Pscore (in 108B) to provide a final periodicity score 108C for each candidate periodicity to add to the output ranking list 108D. The Pscore adjustment 108B is done by increasing 108E or decreasing 108F the current Pscore. Factors that increase (see 108E) the Pscore include obtaining high results from the language module 108G evaluation and indication of small standard deviation of time intervals 108H. Factors that decrease the Pscore (see 108F) include indication of possible signal under-sampling 108I and high local popularity 108J.

Linguistic properties are evaluated by destination ID 108K if the destination field was a domain name. The system detects randomly generated or suspicious looking domain names, by using a language model to determine the probability of seeing a particular domain name. Using the language model, the probability of domain name, such as "example.com", would be determined to be far greater than the probability of a more random domain name. That is, for example:

$P('example.com') \gg P('zghowyihwenbjacibwxz.com')$.

In a preferred exemplary embodiment, a 3-gram (e.g., trigram, meaning contiguous sequence of three items from a given sequence of text, where the items can be phonemes, syllables, letters, words or base pairs according to the application) language model 108G trained on the worldwide most frequently used domain names is used, along with Kneser-Ney smoothing to handle previously unseen n-grams, as follows: $P(c1c2c3c4c5)=P(c3|c1c2) \cdot P(c4|c2c3) \cdot P(c5|c4c3)$ It is noted that Kneser-Ney smoothing is a method primarily used to calculate the probability distribution of n-grams in a document based on their histories and is widely considered the most effective method of smoothing in natural language processing.

Popularity 108L may be given as the number of distinct client IP addresses that have visited the destination domain or IP address over a period of time. The Pscore is diminished if the popularity of the destination is close to a threshold. Periodicity strength determines how strong the periodic behaviors appear and the Pscore increases if it exhibits strong periodicity.

The output of the result ranking step 108 is a rank-ordered output 108D that presents a list with the most relevant source/destination ID pairs in terms of beaconing behavior at the top of the list. In one exemplary embodiment, this output rank listing is provided to an administrator for possible further evaluation, location detection, and possible isolation or deletion.

Figure 5:
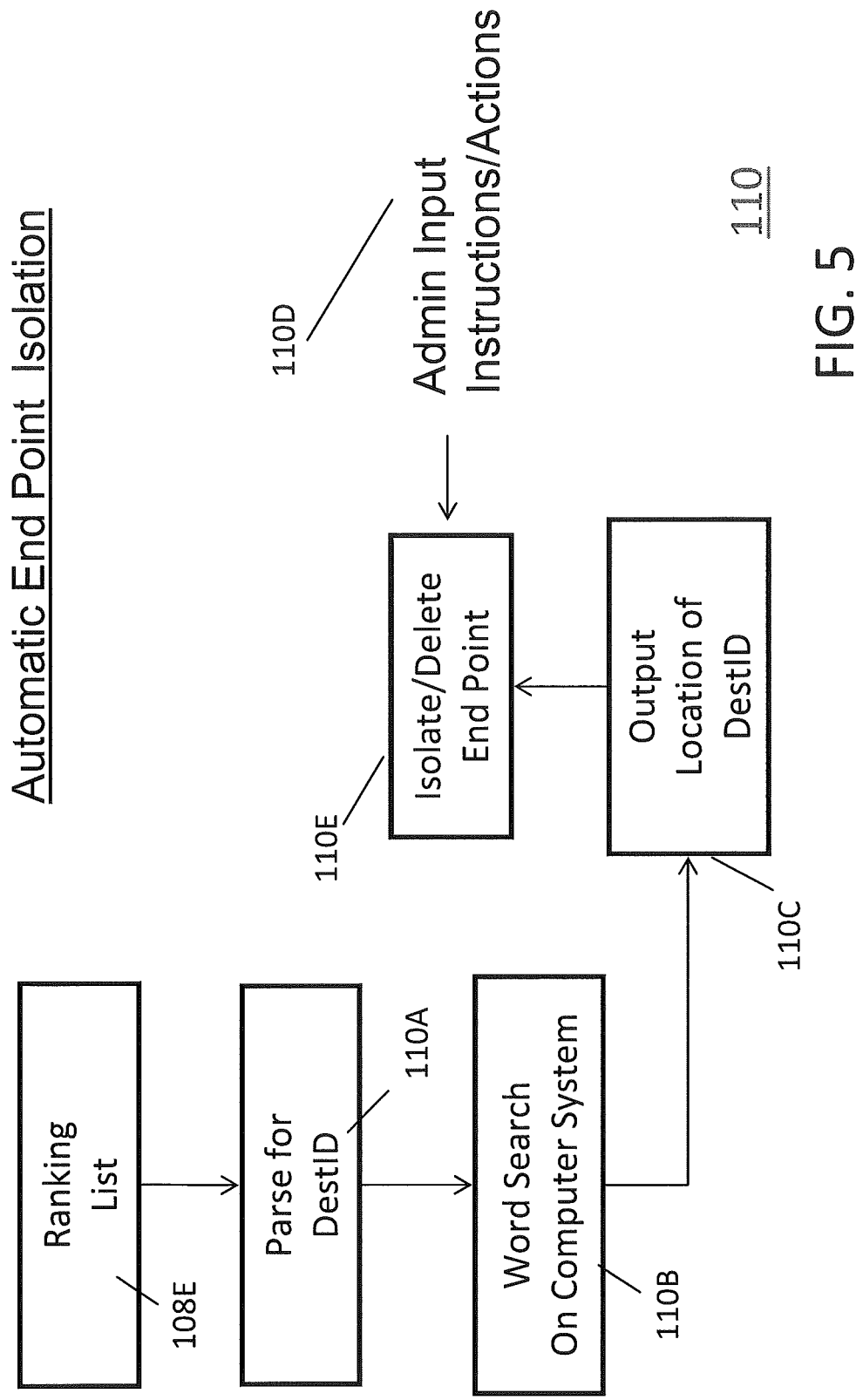
FIG. 5 illustrates the exemplary location/isolation step 110 of the exemplary embodiment 100, in which a detected beaconing source is located for possible isolation.

As a variation, the present invention can be configured with an additional step 110, shown exemplarily in FIG. 5, to either proceed autonomously to locate 110C suspected destination IDs, by parsing the IDs and/or domain names 110A and using a word search 110B of coding on a site being analyzed, or to await an input instruction 110D from an administrator to proceed with the location search. Upon location of suspected IDs, the present invention could be configured to automatically send an alert to an administrator, who can then take action to isolate or delete the suspected IDs 110E, or take other appropriate action such as adding them to a blacklist or take action to isolate or delete the source code in the system being monitored.

Figure 6:
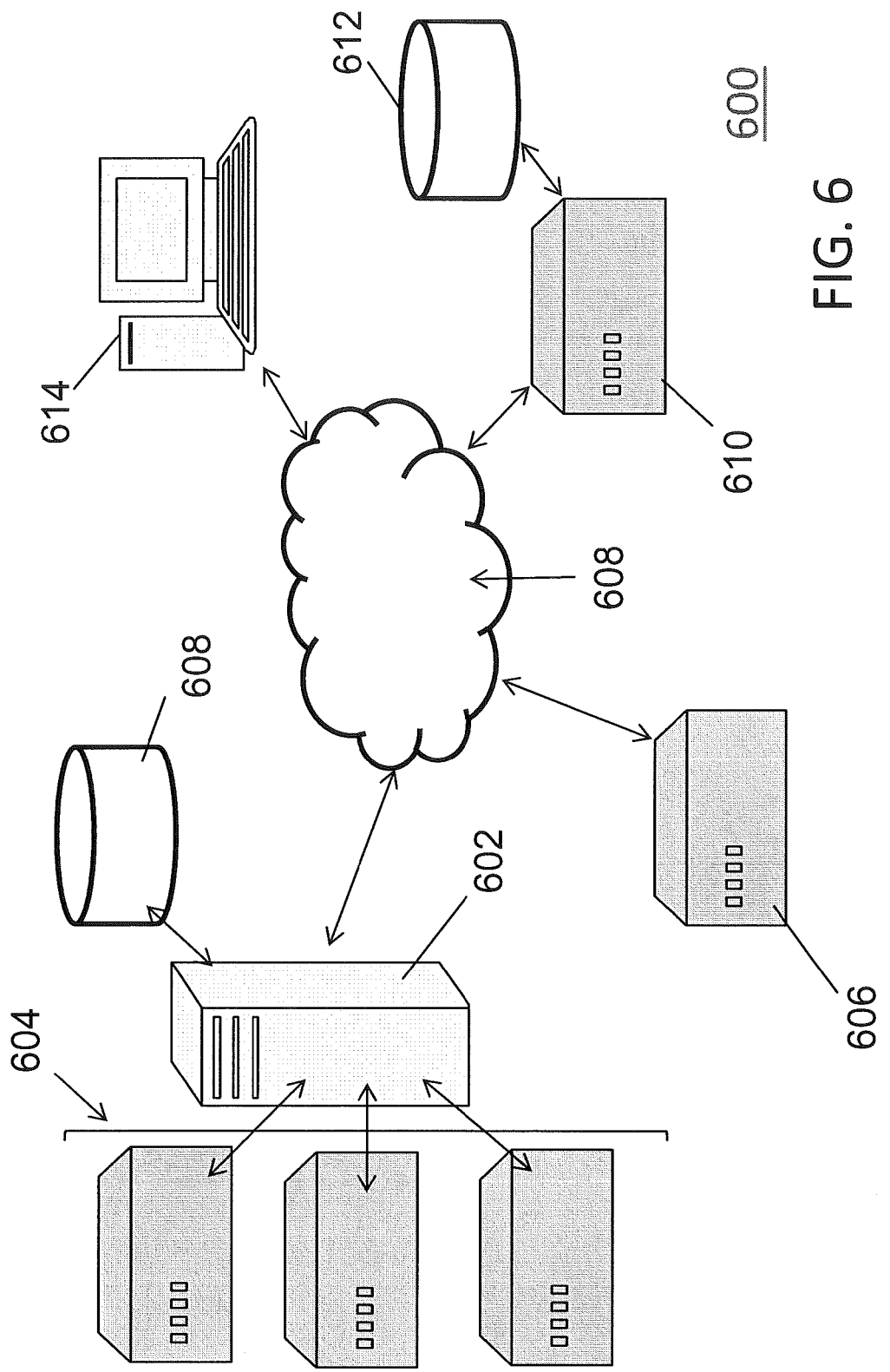
FIG. 6 illustrates exemplary variations 600 for implementing the present invention in a network, including one providing an APT monitoring as a cloud service.

FIGS. 1-5 explain methods underlying exemplary embodiments of the present invention. FIG. 6 shows details 600 of exemplary implementations of the invention in a network. As initially developed, the present invention is intended to be an application-type program selectively executable on a server 602 or gateway that serves as a portal to a protected site or network 604. Since the invention serves a monitoring purpose, it would be preferable to periodically execute the process described in FIGS. 1-5, either under control of a user or administrator or as automatically executed once during a predefined interval such as daily or weekly, etc. Such automatic execution could be implemented, for example, by configuring the application program to execute using a signal from the operating system of the computer 602. Other mechanisms for automatic periodic execution could include receipt of an initiation signal from a remote location 606.

Computer 602 is also shown as associated with a database 608 for storing data from the periodic executions. Such data would permit the system to evaluate longer periods of time, using stored data from previous cycles as well as the data from the current execution period.

In a variation, the tooling of the present invention could be installed on a single computer 610 and providing APT monitoring for that computer alone, with computer 610 possibly having a memory device 612 for storage of APT monitoring history.

FIG. 6 also demonstrates another variation of the present invention in which the evaluation program described herein is offered as a service to other sites desiring to implement their APT monitoring and detecting by the method of the present invention. In this variation, which could even be implemented as a cloud service, the APT detection tool of the present invention is configured to communicate with another computer 614 for which APT monitoring is desired. Computer 614 would provide data for evaluation to the computer on the network executing the APT monitoring, such as computer 602 or 610. The results of the evaluation could be returned to the remote computer 614 for action by a user/administrator at that remote location, or, possibly, the program execution computer 602,610 could communicate with the remote computer 614 for automatic location/disposition of potential threats. The data resultant from an evaluation of the remote computer 614 by the program on computer 602,610 could be returned to computer 614 for evaluation and/or storage, or it could be stored in database 608,612 associated with computer 602,610.

In yet another alternative, computer 602 could be configured to download the APT monitoring tool to remote computer 614 via a network, either by request or via an automatic, periodic downloading mechanism, in order to permit remote computer 614 to itself execute the APT monitoring tool. Typically, as a servicing tool for client users, the APT monitoring tool would be configured for a single execution by the remote computer 614 and would not remain resident in the remote computer 614, as well as possibly other safeguards to preclude the evaluation tool to be transferred to another computer without authorization.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
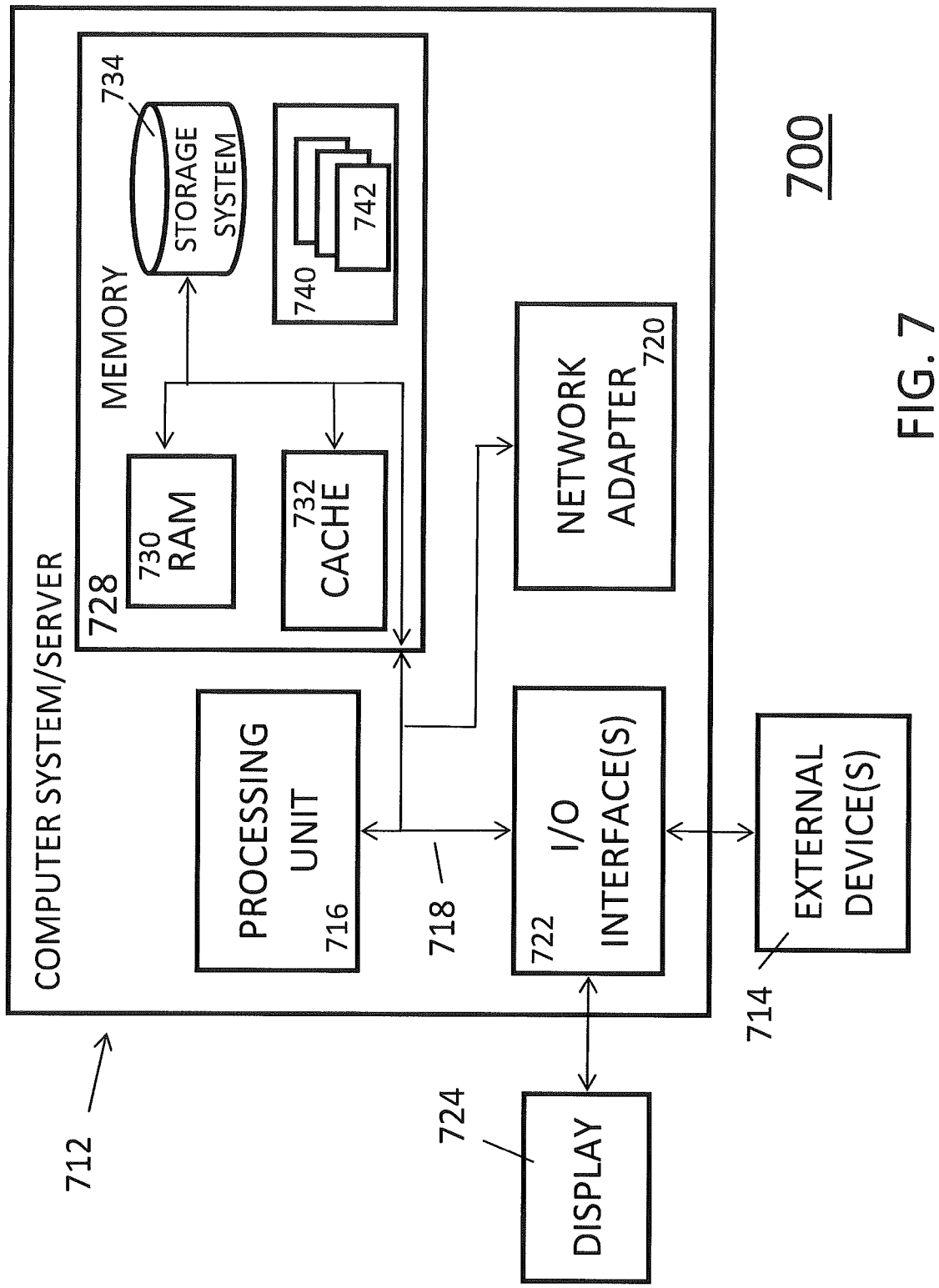
FIG. 7 depicts a cloud computing node 700 according to an exemplary embodiment of the present invention.

Referring now to FIG. 7, a schematic 700 of an example of a cloud computing node is shown. Cloud computing node 700 is only one example of a suitable cloud computing node and is not intended to suggest any limitation as to the scope of use or functionality of embodiments of the invention described herein. Regardless, cloud computing node 700 is capable of being implemented and/or performing any of the functionality set forth hereinabove.

In cloud computing node 700 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
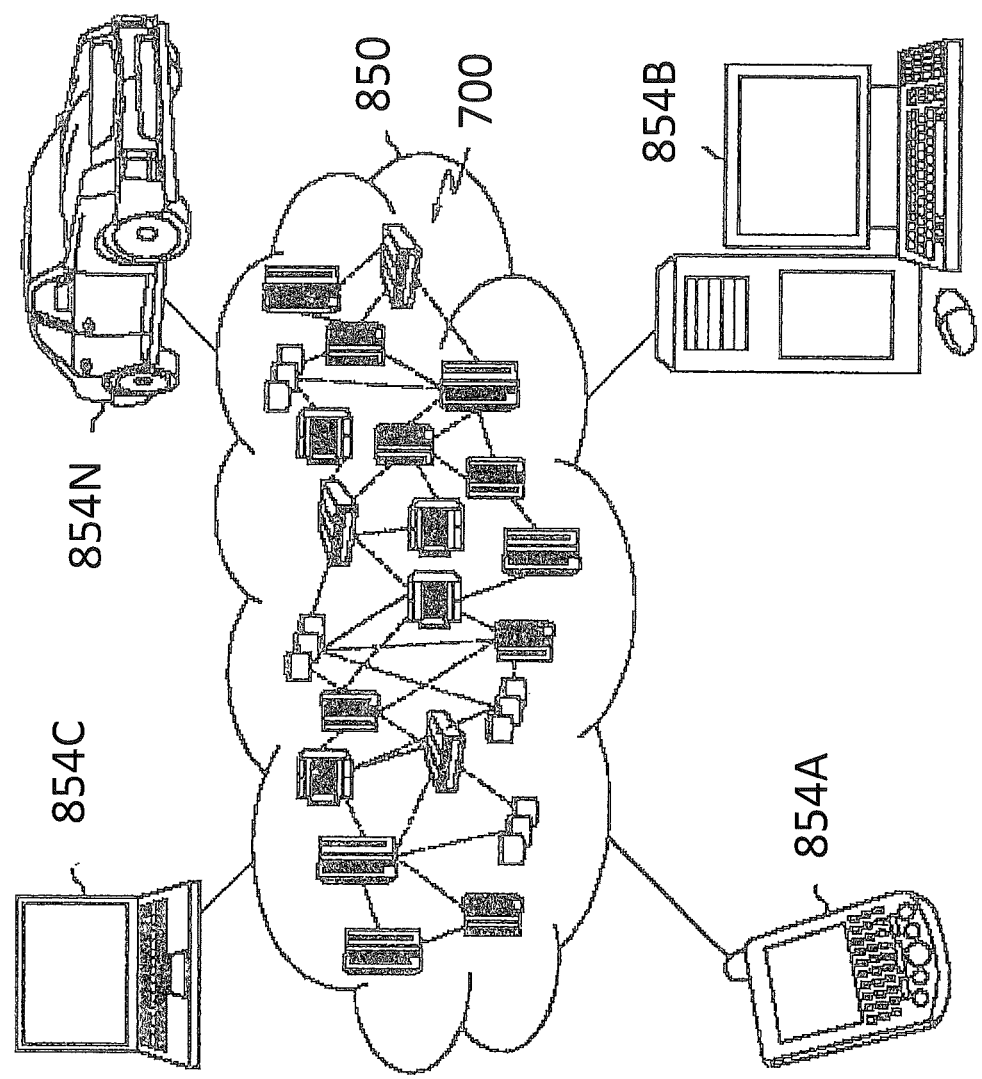
FIG. 8 depicts a cloud computing environment 850 according to an exemplary embodiment of the present invention.

Referring now to FIG. 8, an illustrative cloud computing environment 850 is depicted. As shown, cloud computing environment 850 comprises one or more cloud computing nodes 700 with which local computing devices used by cloud consumers, such as, for example, personal digital assistant (PDA) or cellular telephone 854A, desktop computer 854B, laptop computer 854C, and/or automobile computer system 854N may communicate. Nodes 700 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 700 and cloud computing environment 850 can communicate with any type of computerized device over any type of network and/or network addressable connection (e.g., using a web browser).

Figure 9:
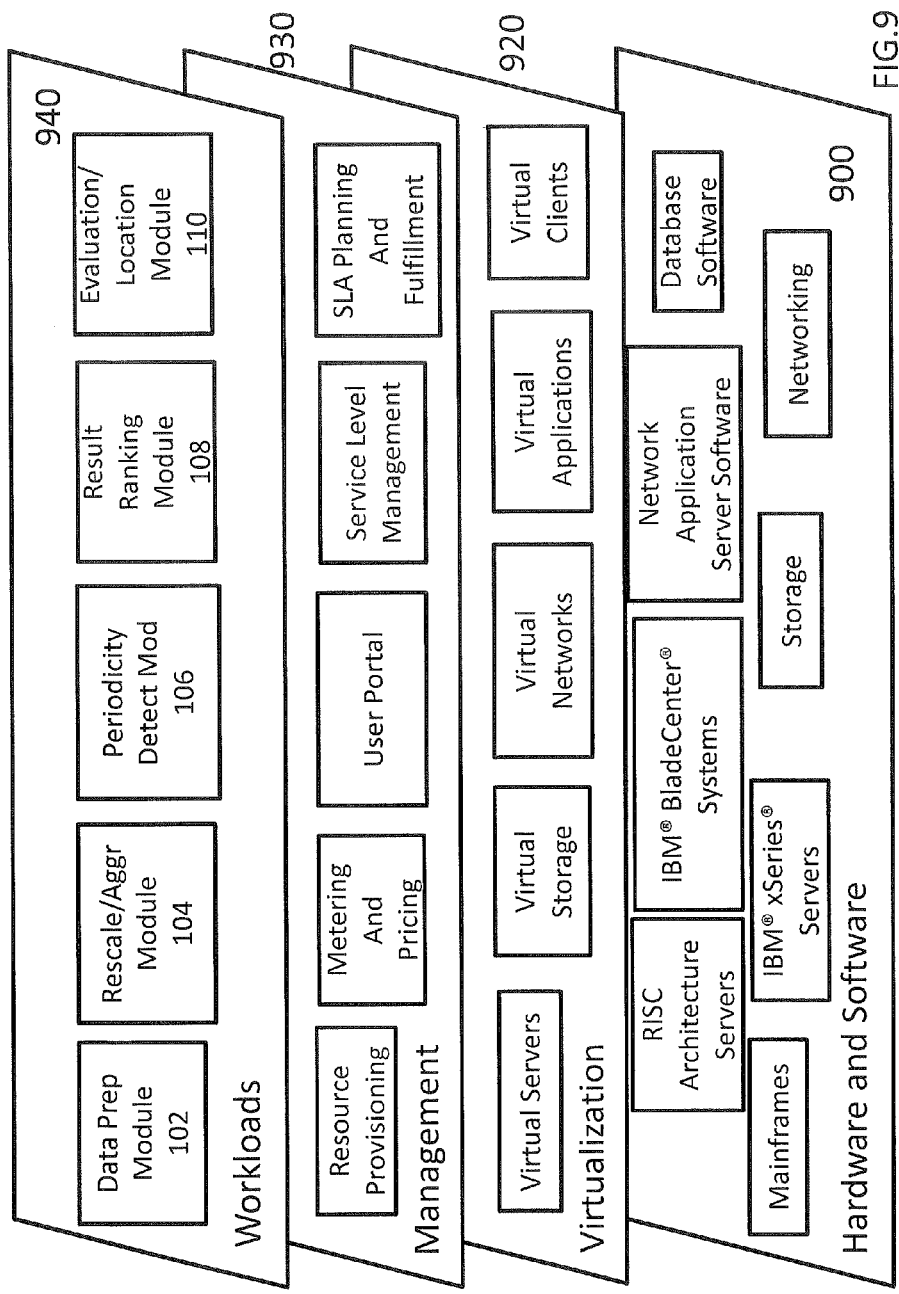
FIG. 9 depicts abstraction model layers 900-940 according to an exemplary embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 900 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 900.

Virtualization layer 920 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 920.

In one example, management layer 930 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 940 provides examples of functionality for which the cloud computing environment may be utilized. Examples of workloads and functions which may be provided from this layer include any number of functions and applications, such as mapping and navigation; software development and lifecycle management; virtual classroom education delivery; data analytics processing; transaction processing; and, more particularly relative to the present invention, the beaconing detection modules 102-110 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer, comprising:
    a memory device; and
    a processor having access to the memory device, the memory device storing a series of machine-readable instructions to execute a method of detecting beaconing behavior,
    wherein the method comprises:
        preprocessing network records to identify candidate source and destination pairs for detecting beaconing behavior, each candidate source and destination pair being associated with a specific time interval in a plurality of time intervals forming a time range, the time intervals and time range having been predefined;
        converting activity time interval information from a time domain into a frequency domain using a Discrete Fourier Transform (DFT); and
        determining candidate frequencies from the candidate source and destination pairs, as likely candidate frequencies or periodicities of beaconing activities.

2. The computer of claim 1, as comprising one of:
    a server or gateway serving as a network portal for a local network of computers, to execute the method for the local network;
    a server on a network accessible via the network and that provides a service of executing the method to an other computer on the network, to execute the method as based on data supplied by the other computer; and
    a server on a network accessible via the network and that provides a service of executing the method to an other computer on the network, to execute the method as based on data supplied by the other computer, as a cloud service.

3. The computer of claim 1, wherein the method further comprises:
    prior to the converting into the frequency domain, rescaling and/or aggregating time intervals such that a plurality of data sets with different time interval resolutions and/or time ranges are included in the plurality of time intervals for each source and destination pair;
    converting the plurality of data sets into the frequency domain; and
    analyzing activity time interval information for each source and destination pair.

4. The computer of claim 3, wherein the method further comprises receiving a user input to define parameters for the rescaling and/or aggregating time intervals.

5. The computer of claim 3, wherein the method further comprises storing the preprocessed network records and the time interval data as rescaled and/or aggregated, for use in future evaluations.

6. The computer of claim 3, wherein the activity time interval information analyzing comprises:
    calculating a power of each source and destination pair in the frequency domain;
    comparing the power of each source and destination pair with a predetermined power threshold value; and
    adding the source and destination pair to a list of candidate frequencies when the power level of the source and destination pair exceeds the predetermined power threshold value.

7. The computer of claim 3, wherein the analyzing of source and destination pairs further comprises filtering out improbable frequencies using a permutation filter.

8. The computer of claim 1, wherein the method further comprises evaluating each pair on the list of candidate frequencies by:
    calculating a score of periodicity strength for each candidate frequency;
    comparing each periodicity strength score with a predetermined periodicity strength threshold value;
    adding, to a listing of candidate periodicities, data for any source and destination pair with a periodicity strength score exceeding the periodicity strength threshold value; and
    ranking the source and destination pairs based on ordering the periodicity scores for the candidate periodicities.

9. The computer of claim 8, wherein the method further comprises, prior to the comparing with the predetermined periodicity strength threshold value, adjusting the periodicity strength score of each candidate source and destination pair based on at least one characteristic.

10. The computer of claim 9, wherein the at least one characteristic comprises at least one of:
    a popularity measurement;
    a language model evaluation of a domain name; and
    at least one measurement of interval statistics.

11. The computer of claim 8, wherein each periodicity strength score is calculated by a weighted combination of a dominance score and an autocorrelation score for each candidate source and destination pair.

12. The computer of claim 1, wherein preprocessing network records further comprises:
    comparing source and destination identifiers to a white list; and
    excluding from further evaluation those records having an identifier on the white list.

13. The computer of claim 1, wherein the converting from the time domain to the frequency domain uses a Discrete Fourier Transform (DFT) as modified with a permutation filter.

14. A computer serving as a server on a network, said computer comprising:
    a memory device; and
    a processor having access to the memory device, the memory device storing a series of machine-readable instructions to execute a method of detecting beaconing behavior, said method comprising:
        receiving network records for a site being evaluated for beaconing behavior;
        preprocessing the network records including source and destination pair data to identify candidate source and destination pairs for detecting beaconing behavior, each candidate source and destination pair being associated with a specific time intervals in a plurality of time intervals forming a time range, the time interval and time range having been predefined;

converting activity time interval information from a time domain into a frequency domain, using a Discrete Fourier Transform (DFT); and determining candidate frequencies from the candidate source and destination pairs as likely candidate frequencies or periodicities of beaconing activities.

15. The computer of claim 14, wherein the DFT is modified with a permutation filter.

16. The computer of claim 14, the method further comprising:

analyzing of source and destination pairs for filtering out improbable frequencies using a permutation filter.

17. The computer of claim 14, wherein the server one of:

executes the method of detecting beaconing behavior based on network data received from a local area network of computers for which the server serves as a network portal;

receives a request from a computer via the network to execute the method of detecting beaconing behavior, receives data from the requesting computer to be processed by the method, and returns to the requesting computer a result of executing the method on the received data; and receives a request from a computer via the network to execute the method and transmits the set of computer-readable instructions to the requesting computer to execute, by the requesting computer, the method of detecting beaconing behavior.

18. The computer of claim 17, wherein the server provides a service of executing the method of detecting beaconing behavior as a cloud service.

19. The computer of claim 14, as comprising one of:

a server serving as a network portal or gateway for a local network of computers, to execute the method for the local network;

a server on a network accessible via the network and that provides a service of executing the method to an other computer on the network, to execute the method as based on data supplied by the other computer; and a server on a network accessible via the network and that provides a service of executing the method to an other computer on the network, to execute the method as based on data supplied by the other computer, as a cloud service.

* * * * *